(12) United States Patent
Kogo

(10) Patent No.: US 9,996,253 B2
(45) Date of Patent: Jun. 12, 2018

(54) GAMING MACHINE AND IMAGE ALTERATION CONTROL METHOD OF GAMING MACHINE

(75) Inventor: Junichi Kogo, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1379 days.

(21) Appl. No.: 11/822,865

(22) Filed: Jul. 10, 2007

(65) Prior Publication Data

US 2008/0132333 A1    Jun. 5, 2008

(30) Foreign Application Priority Data

Jul. 11, 2006 (JP) ................................. 2006-190725

(51) Int. Cl.
*G07F 17/32* (2006.01)
*G06F 3/0488* (2013.01)

(52) U.S. Cl.
CPC ...... *G06F 3/04883* (2013.01); *G07F 17/3211* (2013.01); *A63F 2300/1075* (2013.01); *G06F 2203/04808* (2013.01)

(58) Field of Classification Search
USPC .................................................... 463/36, 37
See application file for complete search history.

(56) References Cited

U.S. PATENT DOCUMENTS

| | | | |
|---|---|---|---|
| 6,210,279 B1 * | 4/2001 | Dickinson ....................... | 463/37 |
| 6,942,571 B1 * | 9/2005 | McAllister et al. ............ | 463/20 |
| 7,374,490 B2 * | 5/2008 | Tahara et al. .................... | 463/43 |
| 7,677,978 B2 * | 3/2010 | Tawara ............................ | 463/37 |
| 7,724,242 B2 | 5/2010 | Hillis | |
| 2004/0119758 A1 * | 6/2004 | Grossman ............ | G06Q 10/109 715/839 |
| 2005/0227762 A1 * | 10/2005 | Tahara et al. .................... | 463/30 |
| 2005/0266906 A1 * | 12/2005 | Stevens ................. | G07F 17/323 463/1 |
| 2006/0026521 A1 * | 2/2006 | Hotelling .............. | G06F 3/0418 715/702 |
| 2006/0112353 A1 * | 5/2006 | Okamoto .............. | G06F 3/0488 715/810 |
| 2007/0243918 A1 * | 10/2007 | Wojewoda .............. | A61F 13/12 463/9 |
| 2008/0058106 A1 * | 3/2008 | Audet ................. | G06F 17/2205 463/42 |

(Continued)

FOREIGN PATENT DOCUMENTS

JP    2005-131298    5/2005
JP    2005-204754    8/2005

(Continued)

OTHER PUBLICATIONS z26 Atari 2600 Emulator Tutorial as captured by the internet archive form May 31, 2006 (https://web.archive.org/web/20060531044307 https://atariage.com/2600/emulation/z26_tutorial/).*

*Primary Examiner* — James S. McClellan
*Assistant Examiner* — Peter Iannuzzi
(74) *Attorney, Agent, or Firm* — Lex IP Meister, PLLC

(57) ABSTRACT

A display area of a selection image becomes larger when two locations corresponding to the selection image on a touch panel are pressed simultaneously by hands of a player and a space between the hands is widened while the hands maintain a state of contact to the touch panel. This enables touch panel operability to be diversified.

12 Claims, 5 Drawing Sheets

(56) References Cited

U.S. PATENT DOCUMENTS

| | | | | |
|---|---|---|---|---|
| 2008/0070682 A1* | 3/2008 | Woody | ............... | A63F 13/06 |
| | | | | 463/30 |
| 2008/0300049 A1* | 12/2008 | Anderson | ............ | G07F 17/32 |
| | | | | 463/25 |
| 2009/0082107 A1* | 3/2009 | Tahara et al. | ............... | 463/37 |

FOREIGN PATENT DOCUMENTS

| | | |
|---|---|---|
| JP | 2005-211242 | 8/2005 |
| JP | 2005-224444 | 8/2005 |

* cited by examiner ved with a touch panel and an image alteration control
method of a gaming machine.

GAMING MACHINE AND IMAGE ALTERATION CONTROL METHOD OF GAMING MACHINE

RELATED APPLICATIONS

This application claims the priority of Japanese Patent Application No. 2006-190725 filed on Jul. 11, 2006, which is incorporated herein by reference.

BACKGROUND OF THE INVENTION

Field of the Invention

The present invention relates to a gaming machine provided with a touch panel and an image alteration control method of a gaming machine.

Description of the Prior Art

In recent years various types of gaming machines provided with touch panels have appeared that offer a player innovative operability.

For example, Japanese Unexamined Patent Publication No. 2005-224444 describes an amusement device provided with a plurality of touch panels that makes possible interesting operation by enabling the player to operate the various touch panels with two hands.

In this regard, in gaming machines provided with a touch panel, it is desirable to offer the player innovative operation using the touch panel and to diversify operability of the touch panel in order to raise player interest.

SUMMARY OF THE INVENTION

An object of the present invention is to provide a gaming machine and an image alteration control method of a gaming machine that enable touch panel operability to be diversified.

A gaming machine according to the present invention is provided with: a display that displays an image; a touch panel arranged covering a display screen of the display; and a controller that, in a case where position signals corresponding to positions pressed by a player and outputted from the touch panel are received and two of the simultaneously received position signals correspond to positions on the image and a space between the position signals continuously changes, enables alteration of a size of the image based on the space between the position signals.

Further, in the gaming machine according to the present invention, the controller varies a display area of the image based on a space between two position signals corresponding to positions on the image.

Still further, in the gaming machine of the present invention, the controller is configured to make the image into a rectangular display area such that a space between two position signals corresponding to positions on the image forms a diagonal line.

In addition, in the gaming machine according to the present invention, selection of the image is achieved by the controller in an operation of selecting from a plurality of selection images displayed in a predetermined region of the display screen, and, the operation of selecting specifies the selection image based on position signals corresponding to pressed positions on the touch panel, moves the specified selection image on the display screen in response to a continuous change in output of the position signals due to continuous change in the pressed positions on the touch panel, and stops movement of the specified selection image on the display screen based on a stop in output of the position signals in response to a release of the pressing operation on the touch panel.

In an image alteration control method of a gaming machine according to the present invention, position signals are received from a touch panel, which is arranged covering a display screen of a display that displays an image and that outputs position signals corresponding to pressed positions, and a size of the image is altered based on a space between the position signals when the simultaneously received two position signals correspond to positions on the image and the space between the position signals changes continuously.

Further, in the image alteration control method of the gaming machine according to the present invention, a display area of the image is varied based on a space between two position signals corresponding to positions on the image.

Still further, in the image alteration control method of the gaming machine according to the present invention, the image is made into a rectangular display area such that a space between two position signals corresponding to positions on the image forms a diagonal line.

In addition, in the image alteration control method of the gaming machine of the present invention, selection of the image is achieved by an operation of selecting from a plurality of selection images displayed in a predetermined region of the display screen, and, the operation of selecting specifies the selection image based on position signals corresponding to the pressed positions on the touch panel, moves the specified selection image on the display screen in response to a continuous change in output of the position signals due to continuous change in the pressed positions on the touch panel, and stops movement of the specified selection image on the display screen based on a stop in output of the position signals in response to a release of the pressing operation on the touch panel.

DESCRIPTION OF THE PREFERRED EMBODIMENTS

Hereinafter, preferred embodiments of the present invention are described with reference to FIGS. 1 to 5.

A gaming machine 1 according to the present embodiment carries out a game by having a player perform a pressing operation on a touch panel arranged covering a display screen of a display that displays various images, and touch panel pressing operations include an operation in which the player touches the touch panel with both hands simultaneously and slides both hands.

Mechanical Configuration of Gaming Machine 1

Figure 1:
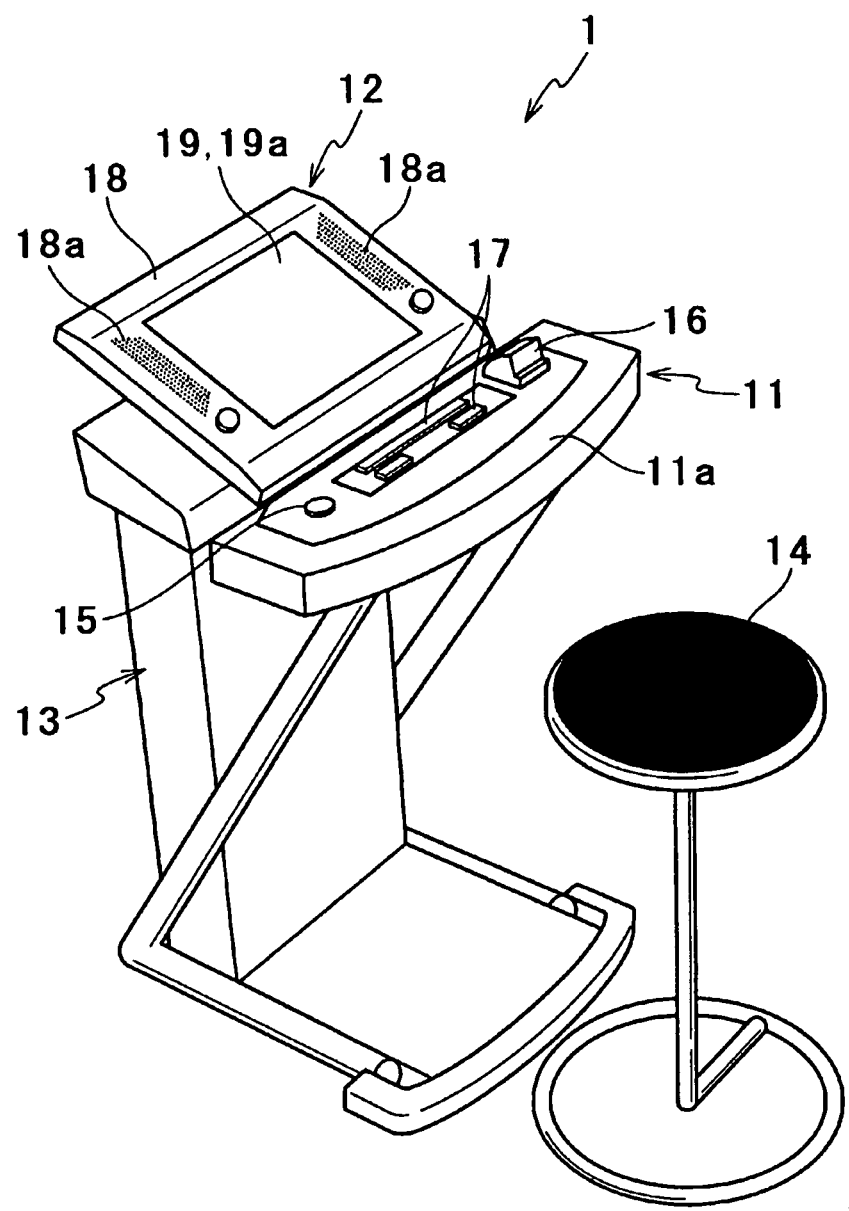
FIG. 1 is a perspective view of a gaming machine.

As shown in FIG. 1, the gaming machine 1 is provided in front with a seat 14 that enables the player to be seated. The gaming machine 1 also has an operation panel device 11 arranged on a front side, which is the side of the seat 14, a display device 12 arranged at a back side of the operation panel device 11, and a support stand 13 that supports the operation panel device 11 and the display device 12.

An operation surface 11a is configured horizontally on the operation panel device 11. The operation surface 11a is provided with a medal insertion slot 16 that is arranged on a lateral direction right end side (rear side of paper plane). Furthermore, a payout button 15 is arranged on a lateral direction left end side of the operation surface 11a, that is, an opposite side from the medal insertion slot 16. Medals, which are paid out in response to a game result, are stored (credited) in the gaming machine 1, and operating the payout button 15 causes medals to be paid out from a payout opening, which is not shown in the drawing. It should be noted that medals credited in the gaming machine 1 can be used in a subsequent game. Various types of operation buttons and effects lamps 17 are arranged between the payout button 15 and the medal insertion slot 16, and the effects lamps 17 light up or turn off in response to a result or content in the game.

Arranged at a rear side of the thus configured operation panel device 11 is the display device 12. The display device 12 is set having its front end area at a height position of the operation panel device 11 and inclined upward from the front end area to its rear end area so as to be easily viewable by a game player seated in the seat 14. The display device 12 has a liquid crystal display device 19 as a display for displaying images and the like relating to the game, a touch panel 19a arranged covering the display screen of the liquid crystal display device 19, and a support frame 18 that supports the liquid crystal display device 19 and the touch panel 19a. The touch panel 19a is formed by a transparent material and is configured to enable viewing of the display screen of the liquid crystal display device 19 by the game player while to enable outputting position signals corresponding to positions pressed by the player. Furthermore, speaker perforations 18a and 18a, which enable sound to pass from a speaker 32 (see FIG. 4) provided at the back surface side, are formed on both sides of the support frame 18. The speaker 32 is used to produce sound effects and the like during the game.

Figure 2A:
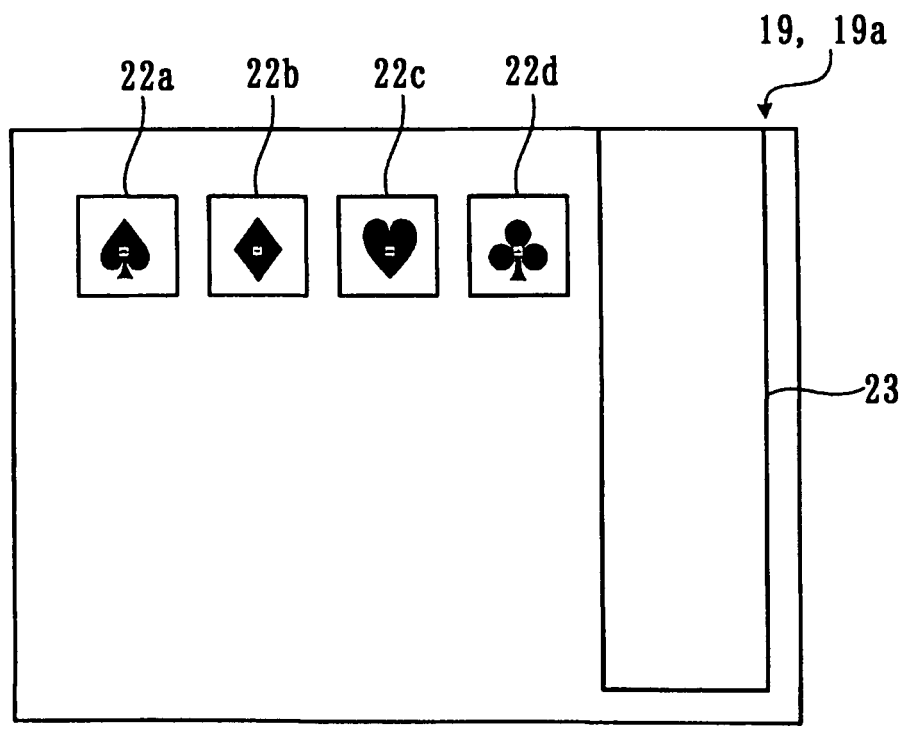
FIGS. 2A and 2B show one example of display screens.

FIG. 2A shows an initial screen at a commencement operation of a game. As shown in FIG. 2A, four selection images 22a to 22d are displayed on the above-described liquid crystal display device 19. It should be noted that in the drawing, the four selection images 22a to 22d are a spade, a diamond, a heart, and a club respectively, but there is no limitation to this. Also, a table image 23 is displayed on the right side of the display screen.

Figure 2B:
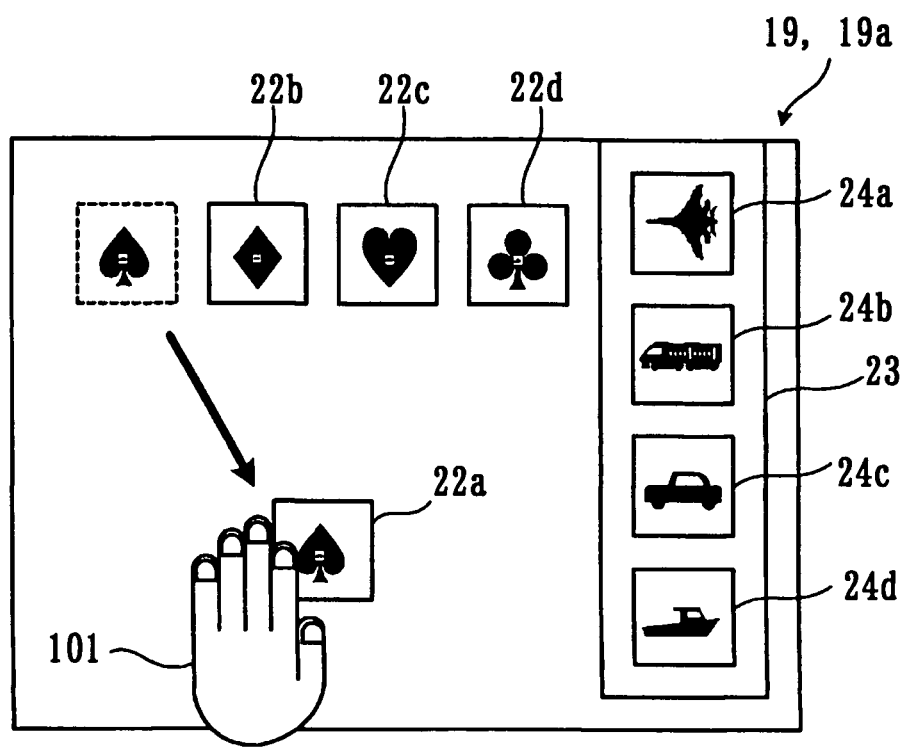

FIG. 2B shows a state in which one of the four selection images 22a to 22d in FIG. 2A (selection image 22a in this drawing) is dragged by a left hand 101 of the player and moved diagonally downward. When the selection image 22a is dropped at a substantially central area of the screen, four corresponding images 24a to 24d are displayed inside the table image 23. Here, the dragging and dropping of images such as the selection images 22a to 22d is carried out based on continuous change in the position signals outputted from the touch panel 19a. That is, when a location corresponding to an image on the touch panel 19a is pressed, position signals are outputted and the image is dragged, and the image that has been dragged moves due to continuous change in the position signals, that is, the pressing positions, then the image is dropped in a location where output of the position signals stops. It should be noted that in the drawing, the four corresponding images 24a to 24d are an airplane, a train, an automobile, and a boat, but there is no limitation to this.

Figure 3A:
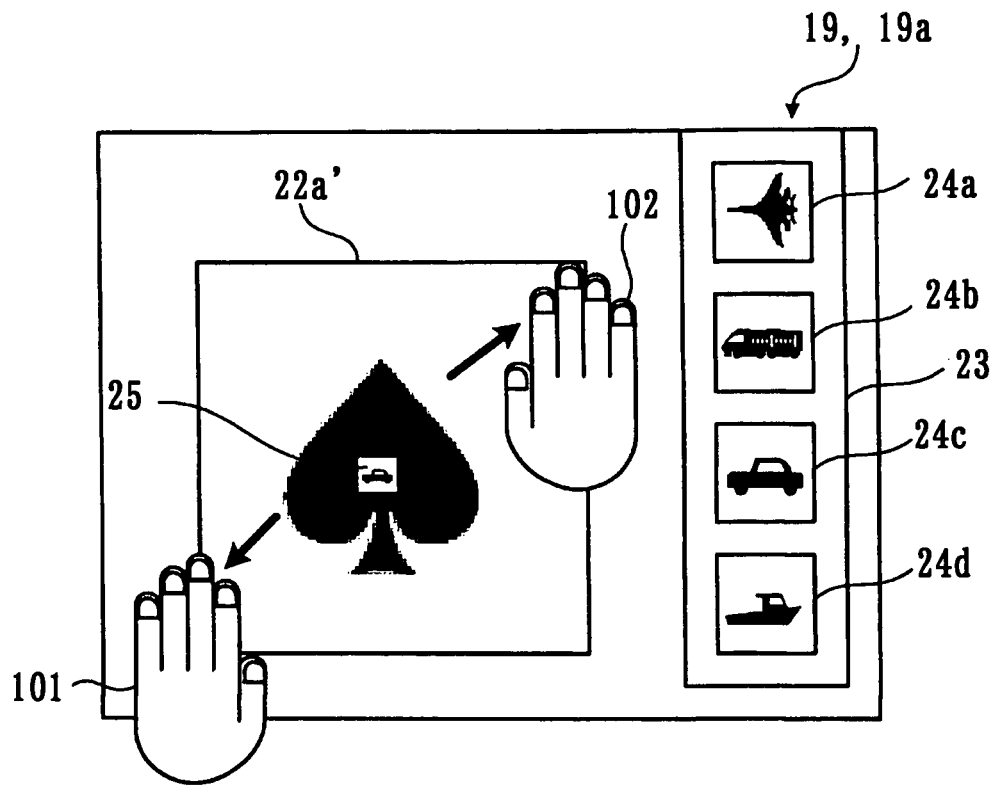
FIGS. 3A and 3B show one example of display screens.

FIG. 3A shows a state in which the selection image 22a selected by the player in FIG. 2B is displayed enlarged by the player using hands 101 and 102 and altered to a selection image 22a' having an enlarged display area (rectangular display area). At this time, two locations on the selection image 22a are simultaneously dragged by the hands 101 and 102 of the player, that is, two locations corresponding to the selection image 22a on the touch panel 19a are pressed simultaneously, for example, operating with the left hand 101 sliding in a left and downward direction and the right hand 102 sliding in a right and upward direction simultaneously, thereby widening the space between the hands 101 and 102. In this way, the space between the two position signals outputted by the touch panel 19a is continuously widened. When this touch panel operation is carried out, the selection image 22a undergoes enlarged display based on the space between the hands 101 and 102, that is, the space between the two image signals, so that the two dragged points form a diagonal line. At a point in time when the hands 101 and 102 of the player perform a drop, an identifying image 25 is displayed in a recognizable state in the center of the selection image 22a' whose display area has been enlarged. It should be noted that the space between the two dragged locations may be widened by moving one either of the hands.

It should be noted that in FIG. 3A when the space between the hands 101 and 102, which are simultaneously dragging two locations on the selection image 22a, becomes narrower, that is, when the space between the two locations that are pressed simultaneously on the touch panel 19a and correspond to the selection image 22a becomes narrower, the space between the two position signals outputted by the touch panel 19a becomes continuously narrower, and the display area of the selection image 22a becomes smaller. That is, widening or narrowing the space between the hands 101 and 102, which are simultaneously dragging two locations on the selection image 22a, causes the space between the two position signals outputted by the touch panel 19a to continuously widen or narrow such that the display area of the selection image 22a becomes larger or smaller.

Here, the touch panel 19a pressing operation so as to become the selection image 22a' whose display area has been enlarged as shown in FIG. 3A is carried out on the selection image 22a that has been selected as one commencement operation of the game, but this may be carried out on an image other than the selection images 22a to 22d and may be carried out during the game.

When the space between two position signals corresponding to positions on the image (a selection image or the like) continuously changes in this manner, that is, when the space between two locations on the image being dragged simultaneously is widened or narrowed, the display area of the image displayed on the liquid crystal display device 19 becomes larger or smaller, and therefore a new operability can be offered to the player and operability using the touch panel can be diversified.

Furthermore, since the display area of the image (a selection image or the like) is altered by touch panel operation in this manner, information contained in the image (an identifying image 25 or the like) can be made recognizable by enlarging the display area of the image.

Figure 3B:
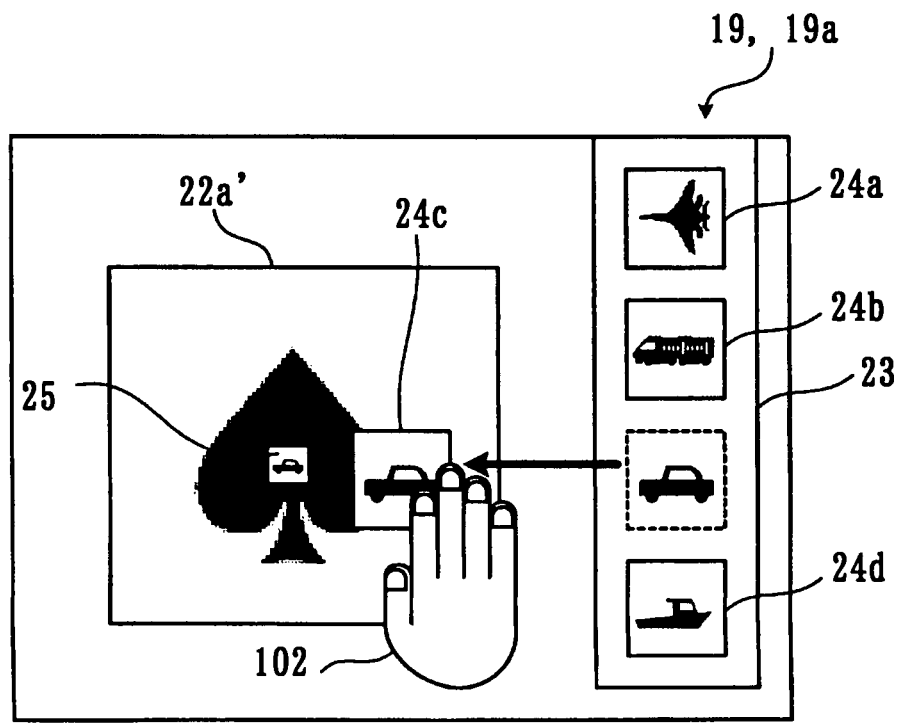

FIG. 3B shows a state in which, of the four corresponding images 24a to 24d displayed in the table image 23, the corresponding image 24c, which corresponds to the identifying image 25 of the selection image 22a' that has been displayed enlarged by the player in FIG. 3A, is dragged by the right hand 102 of the player and moved leftward. When the corresponding image 24c is dropped on the selection image 22a', a game corresponding to the identifying image 25 commences.

It should be noted that in the present embodiment the game does not commence when a corresponding image not corresponding to the identifying image 25 is dropped on the selection image 22a' in FIG. 3B, but in a case such as this it is also possible that a game not corresponding to the identifying image 25 commences and it is also possible that a penalty (loss of points or the like) is imposed on the player.

Electrical Configuration of Gaming Machine 1

Figure 4:
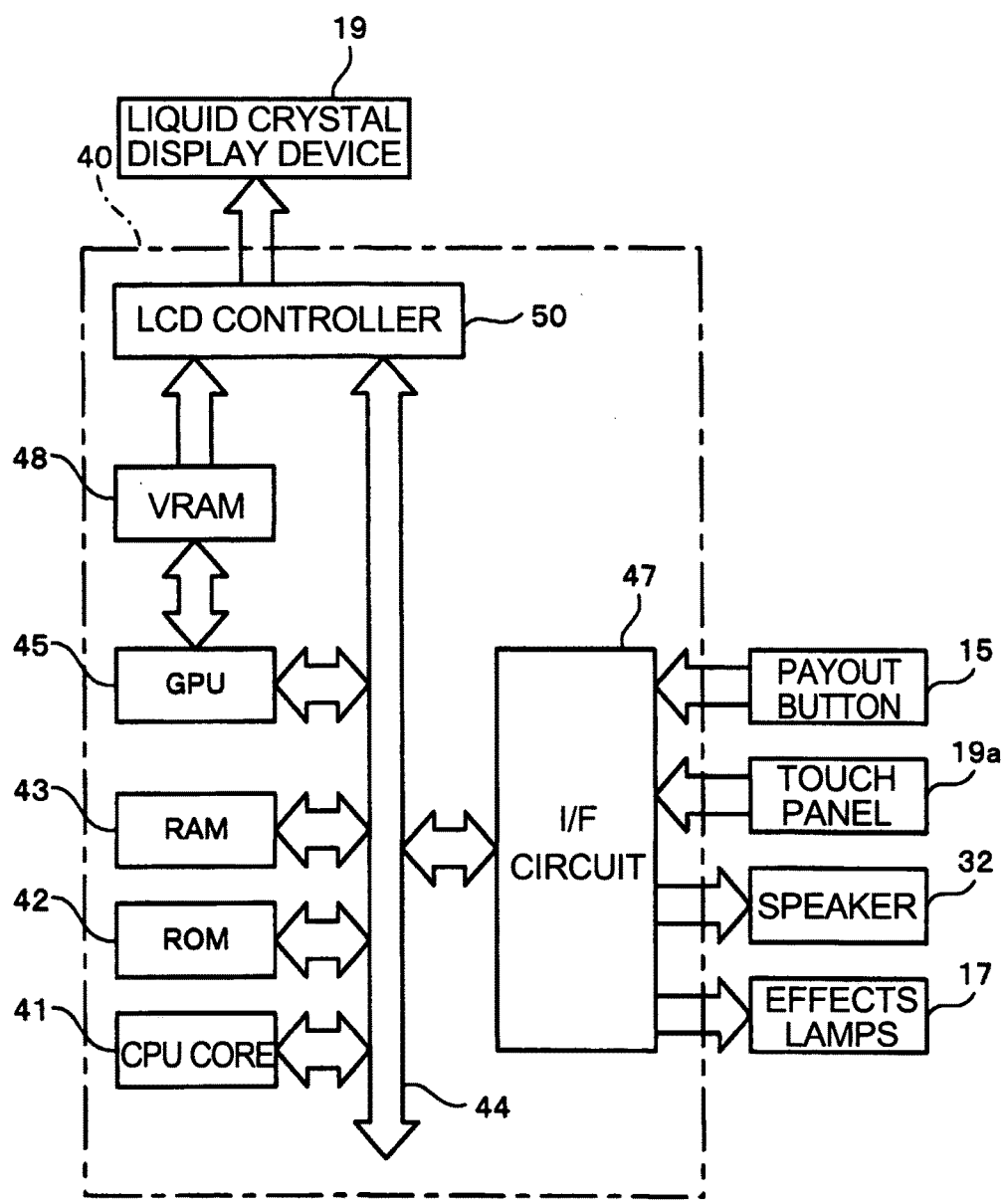
FIG. 4 is a block diagram of electronic circuit board.

As shown in FIG. 4, the gaming machine 1 includes an electronic circuit board 40, and mounted on the electronic circuit board 40 are circuitry components such as a CPU core 41. The CPU core 41 is connected via a bus 44 to a ROM 42, a RAM 43, a graphics processing unit (hereinafter referred to as "GPU") 45, an input-output interface circuit (hereinafter referred to as "I/F circuit") 47, and an LCD controller 50.

The CPU core 41 executes game processing routines that are described later and enables screen display on the liquid crystal display device 19 of images such as the selection images 22a to 22d and the like relating to the game, commencement and execution of the game, movement and enlargement of images in response to pressing operations on the touch panel 19a, and calculations of points in response to game results.

The ROM 42 non-rewritably stores data such as game programs, image data, sound data, and lamp activation data. The RAM 43 rewritably stores temporary data (scoring data, game data) in response to progress of the game.

The GPU 45 is configured on a single chip ASIC for example to form a portion of a drawing means and receives graphics commands (drawing commands) from the CPU core 41, then generates game image data in accordance with the graphics commands. Note however that in addition to graphics commands, the CPU core 41 supplies to the GPU 45 image generation programs that are contained in the game program and are necessary for generating game image data. It should be noted that image data necessary for the GPU 45 to execute drawing commands is obtained by the GPU 45 accessing the ROM 42.

Furthermore, the GPU 45 is connected to a video RAM (hereinafter referred to as "VRAM") 48. The GPU 45 draws the generated game image data in the VRAM 48. The VRAM 48 is connected to the LCD controller 50 as a controller. The LCD controller 50 outputs the game image data that has been drawn in the VRAM 48 to the liquid crystal display device 19.

It should be noted that the above example is described such that the LCD controller 50 is connected to the VRAM 48 and the game image data is obtained from the VRAM 48. However, this may also be configured so that, under instruction of the CPU core 41, the game image data drawn in the VRAM 48 is supplied to the LCD controller 50 by the GPU 45.

The I/F circuit 47 is connected to the payout button 15, the effects lamps 17, the touch panel 19a, and the speaker 32. The CPU core 41 receives signals from the payout button 15 via the I/F circuit 47. Furthermore, the CPU core 41 receives position signals from the touch panel 19a via the I/F circuit 47. Further still, the CPU core 41 reads out from the ROM 42 sound data necessary to the game and for output from the speaker 32 via the I/F circuit 47, and also reads out from the ROM 42 lamp activation data to drive the effects lamps 17 via the I/F circuit 47.

Game Commencement Operation

In the gaming machine 1 as described above, a game commencement operation is as follows.

First, as shown in FIG. 2A, the four selection images 22a to 22d are displayed on the liquid crystal display device 19. Also, the table image 23 is displayed on the right side of the display screen. Then, when one of the four selection images 22a to 22d (the selection image 22a in the drawing) is selected by the player as shown in FIG. 2B, the four corresponding images 24a to 24d are displayed inside the table image 23.

Then, as shown in FIG. 3A, an enlarged (or reduced) display of the selection image 22a is carried out based on the space between the hands 101 and 102 of the player. Following this, when the image 24c selected from the four corresponding images 24a to 24d being displayed in the table image 23 is dropped onto the selection image 22a' by the player as shown in FIG. 3B, a game corresponding to the identifying image 25 commences. For example, if the identifying image 25 is an image of an automobile, a racing game is executed, and if the identifying image 25 is an image of an airplane, a shooting game is executed.

Operation of Gaming Machine 1

Description is given concerning operation of the gaming machine 1 configured as described above.

Game Processing Routine

When power is turned on to the gaming machine 1, a game processing routine not shown in the drawings appears along with other control programs and is executed in parallel. A game corresponding to the identifying image 25 is executed by this game processing routine.

Image Alteration Processing Routine

Figure 5:
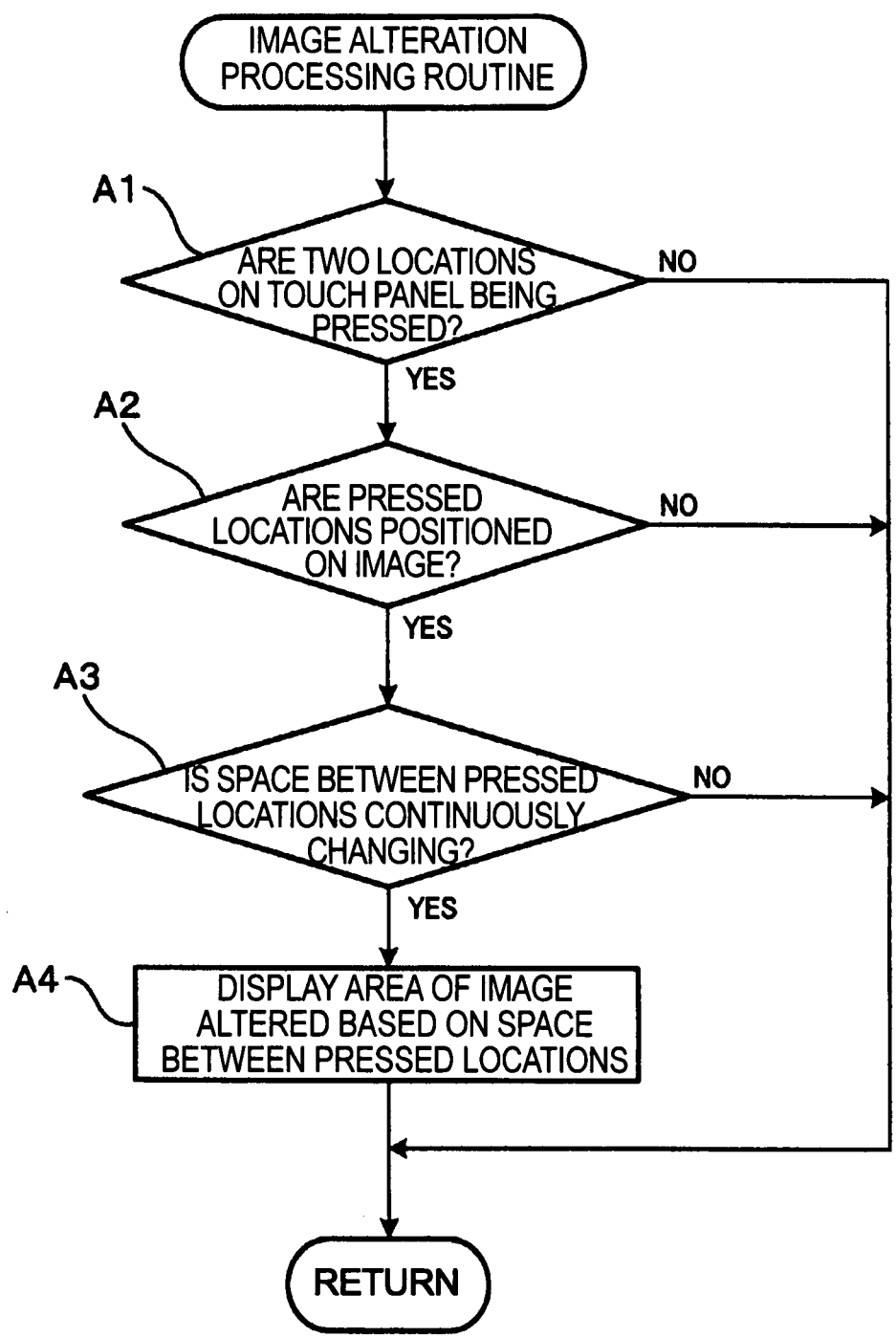
FIG. 5 is a flowchart of image alteration processing routine.

Furthermore, in the game processing routine, the gaming machine 1 executes an image alteration processing routine shown in FIG. 5 at least at a time of commencement processing of the game. That is, when the image alteration processing routine is executed, a determination (A1) is made as to whether or not two locations on the touch panel 19a are being pressed as in the example of FIG. 3A. If two locations on the touch panel 19a are not being pressed (A1: NO), then the routine finishes. If two locations on the touch panel 19a are being pressed (A1: YES), then a determination (A2) is made as to whether or not each of the pressed locations is positioned on the image (which is the selection image 22a not shown in FIG. 3A).

If the pressed locations are not positioned on the image (A2: NO), then the routine finishes. If the pressed locations are positioned on the image (A2: YES), then a determination (A3) is made as to whether or not the space between the pressed locations is continuously changing. If the space between the pressed locations is not continuously changing (A3: NO), then the routine finishes. If the space between the pressed locations is continuously changing (A3: YES), then the space between the hands 101 and 102 of the player simultaneously touching the touch panel 19a as illustrated in FIG. 3A is widening or narrowing, and the display area of the image (the selection image 22a' in FIG. 3A) is altered (A4) based on the space between the pressed locations. Thereafter, the routine finishes.

When the space between two position signals corresponding to positions on the image (a selection image or the like) continuously changes in this manner, that is, when the space between two locations on the image being dragged simultaneously is widened or narrowed, the display area of the image displayed on the liquid crystal display device 19 becomes larger or smaller, and therefore a new operability can be offered to the player and operability using the touch panel can be diversified.

Furthermore, since the display area of the image (a selection image or the like) is altered by touch panel operation in this manner, information contained in the image (an identifying image 25 or the like) can be made recognizable by enlarging the display area of the image.

SUMMARY OF PRESENT EMBODIMENT

As described above, the gaming machine 1 of the present embodiment is provided with a display (the liquid crystal display device 19 or the like) that displays an image (the selection images 22a to 22d or the like), the touch panel 19a arranged covering a display screen of the display, and a controller (the CPU core 41, the LCD controller 50, and the like) that, in a case where position signals corresponding to positions pressed by a player and outputted from the touch panel 19a are received and two of the simultaneously received position signals correspond to positions on the image and a space between the position signals continuously changes, enables alteration of the image based on the space between the position signals.

With the above-described configuration, when the space between two position signals corresponding to positions on the image changes continuously, the image displayed on the display is altered, and therefore a new operability can be offered to the player and operability using the touch panel can be diversified, for example by altering the image such that the display area of the image becomes larger when the player simultaneously presses with both hands two locations corresponding to the image on the touch panel 19a and moves [the hands] so as to make the space therebetween larger while keeping the hands in contact with the touch panel 19a.

Furthermore, in the gaming machine 1 according to the present embodiment, the controller varies the display area of the image based on the space between two position signals corresponding to positions on the image.

With the above-described configuration, the display area of the image is varied based on the space between two position signals corresponding to positions on the image, and therefore, for example, information contained in the image can be made recognizable by enlarging the display area of the image.

Furthermore, the image alteration control method of a gaming machine according to the present embodiment is configured such that position signals are received from the touch panel 19a, which is arranged covering the display screen of the display (the liquid crystal display device 19 or the like) that displays an image (the selection images 22a to 22d or the like) and that outputs position signals corresponding to positions pressed by the player, and the image is altered based on the space between the position signals when the simultaneously received two position signals correspond to positions on the image and the space between the position signals changes continuously.

With the above-described configuration, when the space between two position signals corresponding to positions on the image changes continuously, the image displayed on the display is altered, and therefore a new operability can be offered to the player and operability using the touch panel can be diversified, for example by altering the image such that the display area of the image becomes larger when the player simultaneously presses with both hands two locations corresponding to the image on the touch panel 19a and moves the hands so as to make the space therebetween larger while keeping the hands in contact with the touch panel 19a.

Furthermore, in the image alteration control method of a gaming machine according to the present embodiment, the display area of the image is varied based on the space between two position signals corresponding to positions on the image.

With the above-described configuration, the display area of the image is varied based on the space between two position signals corresponding to positions on the image, and therefore, for example, information contained in the image can be made recognizable by enlarging the display area of the image.

MODIFIED EXAMPLES OF THE PRESENT EMBODIMENT

The present invention is described above based on preferred embodiments, but the present invention can be modified without departing from the purport thereof. That is, the present embodiment is configured such that the image (the selection images 22a to 22d or the like) is displayed enlarged or reduced by two points being dragged by the hands 101 and 102 so as to form a diagonal line, but there is no limitation to this configuration, and a configuration is also possible in which the image is displayed altered in response to two destination points of movement dragged by the hands 101 and 102.

It should be noted that the present invention is described in the preferred embodiments above but the present invention is not limited to merely these embodiments. Various other embodiments are conceivable without departing from the purport and scope of the present invention. Further still, operations and effects of the present invention are stated in the present embodiments but these operations and effects constitute a single example and do not limit the present invention.

What is claimed is:
1. A gaming machine, comprising:
a display that displays an image;
a touch panel arranged covering a display screen of the display; and
a controller that,
in a case where position signals corresponding to positions touched by a player and outputted from the touch panel are received and two of received position signals correspond to positions on the image respectively and a space between the position signals continuously changes, enlarge a size of the image based on the space between the position signals to provide the player with information image included in the image,
drop any one image selected from among a plurality of predetermined images on the enlarged image, and
execute a game corresponding to the dropped image when the dropped image corresponds to the information image included in the enlarged image.
2. The gaming machine according to claim 1, wherein the controller varies a display area of the image based on a space between two position signals corresponding to positions on the image.
3. The gaming machine according to claim 1, wherein the controller is configured to make the image into a rectangular display area such that a space between two position signals corresponding to positions on the image forms a diagonal line.

4. The gaming machine according to claim 1, wherein:
selection of the image is achieved by the controller in an operation of selecting from a plurality of selection images displayed in a predetermined region of the display screen; and
the operation of selecting specifies the selection image based on position signals corresponding to touched positions on the touch panel, moves the specified selection image on the display screen in response to a continuous change in output of the position signals due to continuous change in the touched positions on the touch panel, and stops movement of the specified selection image on the display screen based on a stop in output of the position signals in response to a release of the touching operation on the touch panel.

5. An image alteration control method of a gaming machine, comprising:
enlarging a size of an image to provide a player with information image included in the image based on a space between position signals when the position signals are received from a touch panel, which is arranged covering a display screen of a display that displays an image and which outputs position signals corresponding to touched positions, and when received two position signals correspond to positions on the image respectively and the space between the position signals changes continuously;
dropping any one image selected from among a plurality of predetermined images on the enlarged image; and
executing a game corresponding to the dropped image when the dropped image corresponds to the information image included in the enlarged image.

6. The image alteration control method of a gaming machine according to claim 5, wherein a display area of the image is varied based on a space between two position signals corresponding to positions on the image.

7. The image alteration control method of a gaming machine according to claim 5, wherein the image is made into a rectangular display area such that a space between two position signals corresponding to positions on the image forms a diagonal line.

8. The image alteration control method of a gaming machine according to claim 5, wherein:
selection of the image is achieved by an operation of selecting from a plurality of selection images displayed in a predetermined region of the display screen; and
the operation of selecting specifies the selection image based on position signals corresponding to the touched positions on the touch panel, moves the specified selection image on the display screen in response to a continuous change in output of the position signals due to continuous change in the touched positions on the touch panel, and stops movement of the specified selection image on the display screen based on a stop in output of the position signals in response to a release of the touching operation on the touch panel.

9. A gaming machine, comprising:
a display that displays a plurality of selection images;
a touch panel arranged covering a display screen of the display; and
a controller that executes, in response to a selection operation for selecting any one selection image from among the plurality of selection images and an enlarging operation on the touch panel, an image enlarging process including
determining whether position information received from the touch panel corresponds to two positions, and
enlarging a size of the selected selection image according to a space between the two positions when the position information received from the touch panel corresponds to the two positions and the space between the two positions continuously changes,
wherein the display displays a plurality of corresponding images that correspond to the plurality of selection images, respectively, and
wherein when any one corresponding image selected from among the plurality of corresponding images is dropped on the selected selection image in response to an operation on the touch panel, the controller executes a game corresponding to the dropped corresponding image.

10. The gaming machine according to claim 9, wherein the game corresponding to the dropped corresponding image is executed when the dropped corresponding image corresponds to the selected selection image, and
wherein the controller does not execute the game corresponding to the dropped corresponding image is executed when the dropped corresponding image does not correspond to the selected selection image.

11. The gaming machine according to claim 1, wherein the controller does not execute the game corresponding to the dropped image when the dropped image does not correspond to the information image included in the enlarged image.

12. The image alteration control method according to claim 5, wherein the game corresponding to the dropped image is not executed when the dropped image does not correspond to the information image included in the enlarged image.

* * * * *